US011643549B2

(12) United States Patent
Li et al.

(10) Patent No.: US 11,643,549 B2
(45) Date of Patent: May 9, 2023

(54) POLYCARBONATE COMPOSITION, MOLDED ARTICLE PREPARED FROM SAME, AND USE THEREOF

(71) Applicant: COVESTRO INTELLECTUAL PROPERTY GMBH & CO. KG, Leverkusen (DE)

(72) Inventors: Shoujun Li, Shanghai (CN); Zhenyu Huang, Shanghai (CN); Xiaoxiang Wang, Shanghai (CN)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 39 days.

(21) Appl. No.: 17/046,281

(22) PCT Filed: Apr. 9, 2018

(86) PCT No.: PCT/CN2018/082306
§ 371 (c)(1),
(2) Date: Oct. 8, 2020

(87) PCT Pub. No.: WO2019/195979
PCT Pub. Date: Oct. 17, 2019

(65) Prior Publication Data
US 2021/0079213 A1    Mar. 18, 2021

(51) Int. Cl.
C08L 69/00    (2006.01)
C08K 5/523    (2006.01)
C08K 3/34    (2006.01)
C08K 5/103    (2006.01)
C08L 25/12    (2006.01)

(52) U.S. Cl.
CPC .............. *C08L 69/00* (2013.01); *C08K 3/34* (2013.01); *C08K 5/103* (2013.01); *C08K 5/523* (2013.01); C08K 2201/006 (2013.01); C08L 25/12 (2013.01); C08L 2201/08 (2013.01); C08L 2203/20 (2013.01); C08L 2205/03 (2013.01)

(58) Field of Classification Search
None
See application file for complete search history.

(56) References Cited

U.S. PATENT DOCUMENTS

| 2,991,273 | A | 7/1961 | Hechelhammer et al. |
| 2,999,835 | A | 9/1961 | Goldberg |
| 2,999,846 | A | 9/1961 | Schnell et al. |
| 3,148,172 | A | 9/1964 | Fox |
| 3,271,367 | A | 9/1966 | Schnell et al. |
| 3,879,348 | A | 4/1975 | Serini et al. |
| 4,379,910 | A | 4/1983 | Mark et al. |
| 4,982,014 | A | 1/1991 | Freitag et al. |
| 5,097,002 | A | 3/1992 | Sakashita et al. |
| 5,340,905 | A | 8/1994 | Kühling et al. |
| 5,672,645 | A | 9/1997 | Eckel et al. |
| 5,717,057 | A | 2/1998 | Sakashita et al. |
| 5,723,526 | A | 3/1998 | Nagasawa |
| 6,528,561 | B1 | 3/2003 | Zobel et al. |
| 6,596,840 | B1 | 7/2003 | Kratschmer et al. |
| 6,740,730 | B1 | 5/2004 | Kratschmer et al. |
| 7,071,284 | B2 | 7/2006 | Kauth et al. |
| 2004/0178383 | A1 | 9/2004 | Kikuchi |
| 2010/0029812 | A1* | 2/2010 | Tanabe .................. G02B 1/041 524/91 |
| 2012/0244305 | A1* | 9/2012 | Chen ..................... H01B 3/302 523/451 |
| 2013/0079443 | A1 | 3/2013 | Taschner et al. |
| 2014/0303296 | A1* | 10/2014 | Inazawa .................. C08K 3/34 524/165 |
| 2015/0210850 | A1 | 7/2015 | Yamada et al. |

(Continued)

FOREIGN PATENT DOCUMENTS

| CA | 2335948 | A1 | 1/2000 |
| CN | 101023134 | A | 8/2007 |
| CN | 101200584 | A | 6/2008 |
| CN | 101255271 | A | 9/2008 |
| DE | 1570703 | A1 | 2/1970 |
| DE | 2036052 | A1 | 1/1972 |
| DE | 2063050 | A1 | 7/1972 |
| DE | 2211956 | A1 | 10/1973 |
| DE | 3832396 | A1 | 2/1990 |
| EP | 0363608 | A1 | 4/1990 |
| EP | 0640655 | A2 | 3/1995 |
| FR | 1561518 | A | 3/1969 |
| GB | 1122003 | A | 7/1968 |
| GB | 1229482 | A | 4/1971 |
| GB | 1367790 | A | 9/1974 |
| JP | 7126510 | A | 5/1995 |
| JP | 07228764 | * | 8/1995 |

(Continued)

OTHER PUBLICATIONS

Nippon Talc Co.; Fine Powder Talc (2022) pp. 1-3. (Year: 2022).*

(Continued)

Primary Examiner — David J Buttner
(74) Attorney, Agent, or Firm — The Webb Law Firm

(57) ABSTRACT

A polycarbonate composition comprising: (A) a polycarbonate; (B) an acrylonitrile-styrene copolymer in an amount of 0 to 15 wt % by weight, based on 100 wt % by weight of the total amount of the components (A) to (D); (C) inorganic filler in an amount of 19 to 33% by weight, wherein talc is contained in an amount of 13 to 33% by weight, based on 100% by weight of the total amount of the components (A) to (D); (D) an organic phosphorus compound-based flame retardant, the component (D) being present in an amount of >2.5 to <7.5% by weight, based on 100% by weight of the total amount of the components (A) to (D); and (E) a fluorine-containing anti-dripping agent; wherein the talc has a specific surface area of 4 to 18 $m^2/g$, as measured by B.E.T. method in accordance with DIN ISO 9277:2014-01; the talc has a median particle diameter $D_{50}$ of 3 to 18 μm, as measured by laser diffraction method. A molded article prepared from the polycarbonate composition, and the use of the polycarbonate composition in the manufacture of chassis or frame in the parts of electrical, electronic and information technology applications.

9 Claims, No Drawings

(56) References Cited

U.S. PATENT DOCUMENTS

| | | | |
|---|---|---|---|
| 2018/0037735 A1* | 2/2018 | Kochesfahani | C08K 9/06 |
| 2018/0066133 A1* | 3/2018 | Chen | C08K 3/013 |
| 2020/0291226 A1* | 9/2020 | Soma | C08K 5/5399 |

FOREIGN PATENT DOCUMENTS

| | | | |
|---|---|---|---|
| JP | 11199767 | * | 7/1999 |
| JP | 2001-164105 A | | 6/2001 |
| JP | 2003-183490 A | | 7/2003 |
| JP | 2004323565 | * | 11/2004 |
| JP | 2006-036877 | | 2/2006 |
| JP | 200888041 A | | 4/2008 |
| JP | 2010144129 | * | 7/2010 |
| JP | 2011-236288 A | | 11/2011 |
| JP | 2017110045 | * | 6/2017 |
| JP | 2018-505292 A | | 2/2018 |
| WO | WO-0000541 A1 | | 1/2000 |
| WO | WO-0105866 A1 | | 1/2001 |
| WO | WO-0105867 A1 | | 1/2001 |
| WO | WO-0118105 A1 | | 3/2001 |
| WO | WO-2004063249 A1 | | 7/2004 |
| WO | 2014/034012 A1 | | 3/2014 |

OTHER PUBLICATIONS

International Search Report for PCT/CN2018/082306 dated Jan. 8, 2019.

Written Opinion of the International Searching Authority for PCT/CN2018/082306 dated Jan. 8, 2019.

* cited by examiner

POLYCARBONATE COMPOSITION, MOLDED ARTICLE PREPARED FROM SAME, AND USE THEREOF

CROSS-REFERENCE TO RELATED APPLICATIONS

This application is a national stage application (under 35 U.S.C. § 371) of PCT/CN2018/082306, filed Apr. 9, 2018, which is incorporated herein by reference in its entirety.

TECHNICAL FIELD

The present invention refers to a polycarbonate composition, a molded article prepared from the polycarbonate composition, and use of the polycarbonate composition in the manufacture of chassis or frames of the parts useful in electrical, electronic and information technology applications.

BACKGROUND ART

Molded articles in the electrical, electronic and information technology applications, such as chassis or frame, require good flowability, high stiffness, good flame retardancy and heat resistance. Various solutions have been proposed for use in resin compositions for chassis or frame with the purpose of obtaining better product properties while reducing production costs. For example, it is always a goal to pursue in the prior art to provide resin compositions having good flowability, high stiffness, good flame retardancy and heat resistance in combination. In the meantime, it is desired to make sure the reduction in the costs for product molds.

US 2004/0178383A1 discloses a resin composition comprising (1) an aromatic polycarbonate, (2) an acrylonitrile-styrene copolymer, (3) mica as well as talc and/or wollastonite having a specific particle diameter as inorganic filler, (4) an organic phosphorus compound as flame retardant, and (5) a fluorine-containing compound as anti-dripping agent.

At present, it is still desired to develop a polycarbonate composition having good flowability, high stiffness, good flame retardancy, heat resistance and low hardness in combination. Preferably, the shear viscosity (determined according to ISO 11443:2014-04 at 260° C., 1000 s$^{-1}$) is ≤340 Pa·s, the flexural modulus (size of the testing sample: length 80 mm×width 10 mm×thickness 4 mm, measured at 2 mm/min according to ISO 178: 2010) is ≥6000 MPa, more preferably ≥6200, HDT (size of the testing sample: length 80 mm×width 10 mm×thickness 4 mm, measured under a load of 1.8 MPa according to ISO 75-2:2013) is ≥105 and V1, more preferably V0 UL 94 is passed at 1.5 mm. Even more preferred, Rockwell hardness of articles made from the composition in addition thereto is ≤69.

SUMMARY OF THE INVENTION

According to an aspect of the invention, it is provided a polycarbonate composition comprising:
(A) a polycarbonate;
(B) an acrylonitrile-styrene copolymer (AS resin) in an amount of 0 to 15% by weight, based on the total weight of the components (A) to (D);
(C) inorganic filler in an amount of 19 to 33% by weight, preferably 20 to 31% by weight, and more preferably 22 to 30% by weight, wherein talc is contained in an amount of 13 to 33% by weight, preferably 15 to 33% by weight, more preferably 17 to 33% by weight, based on 100% by weight of the total amount of the components (A) to (D);
(D) an organic phosphorus compound-based flame retardant, the component (D) being present in an amount of >2.5 to <7.5% by weight, preferably 3.0 to 7.2% by weight, more preferably 3.25 to 7% by weight, particularly preferred 3.5 to 6.5% by weight, most preferred 4 to 6% by weight, based on 100% by weight of the total amount of the components (A) to (D); and
(E) a fluorine-containing anti-dripping agent;
wherein the talc has a specific surface area of 4 to 18 m$^2$/g, preferably 8 to 15 m$^2$/g, and more preferably 10 to 14 m$^2$/g, as measured by B.E.T. method in accordance with DIN ISO 9277:2014-01; the talc has a median particle diameter D$_{50}$ of 3 to 18 μm, preferably 3.1 to 10 μm, and more preferably 3.2 to 8 μm, as measured by laser diffraction method.

The present invention further provides molded articles prepared from the polycarbonate composition.

The present invention further provides use of the polycarbonate composition in the manufacture of chassis or frames of the parts useful in electrical, electronic and information technology applications, such as that in printers and copiers.

By using talc having a given specific surface area, particle diameter and hardness, and particular components to prepare a polycarbonate composition, the present invention allows the production of a composition having a relatively lower hardness, thereby reducing the abrasion of a mold, and also a good flowability, high stiffness, excellent flame retardancy and heat resistance.

DETAILED DESCRIPTION OF THE INVENTION

The polycarbonate composition in the sense of the invention means a mixture obtained by mixing raw materials, and is preferably solid granules which have been melted, extruded and granulated. Stiffness, flame retardancy, heat resistance and the hardness of the composition are determined after the injection molding of solid granules which have been melted, extruded and granulated. Flowability is determined by measuring the shear viscosity at a high temperature and a specific shear rate. For the sake of simplicity, these physical properties are simply referred to as the properties of the composition of the present invention. The determination methods, as applicable wherever the respective properties are mentioned, are given in the examples section.

Unless otherwise specified, all operations in the present invention are carried out at normal temperature and pressure.

Unless otherwise specified, all content percentages of the composition or mixture in the present invention are weight ratio, and the sum of the content percentages of components (A) to (D) in the composition is 100 wt %. Other content ratios are parts by weight (pbw), which is used for additional components which are added to the composition of (A) to (D). The pwb of the additional components are put in relation to components (A)-(D).

The polycarbonate composition according to the present invention comprises:
(A) a polycarbonate;
(B) an acrylonitrile-styrene copolymer (AS resin) in an amount of 0 to 15% by weight, based on the total weight of the components (A) to (D);
(C) inorganic filler in an amount of 19 to 33% by weight, preferably 20 to 31% by weight, and more preferably 22 to 30% by weight, wherein talc is contained in an amount of 13 to 33% by weight, preferably 15 to 33% by weight, more preferably 17 to 33% by weight, based on 100% by weight of the total amount of the components (A) to (D);

(D) an organic phosphorus compound-based flame retardant, the component (D) being present in an amount of >2.5 to <7.5% by weight, preferably 3.0 to 7.2% by weight, more preferably 3.25 to 7% by weight, particularly preferred 3.5 to 6.5% by weight, most preferred 4 to 6% by weight, based on 100% by weight of the total amount of the components (A) to (D); and (E) a fluorine-containing anti-dripping agent;

wherein the talc has a specific surface area of 4 to 18 m$^2$/g, preferably 8 to 15 m$^2$/g, and more preferably 10 to 14 m$^2$/g, as measured by B.E.T method in accordance with DIN ISO 9277:2014-01; the talc has a median particle diameter D50 of 3 to 18 μm, preferably 3.1 to 10 μm, and more preferably 3.2 to 8 μm, as measured by laser diffraction method.

If the content of component C is less than 19% by weight, the flexural elastic modulus will be less than 6000 Pa·s so that the stiffness of the resultant polycarbonate composition doesn't satisfy the application requirements. If the content of component C is too high (more than 33% by weight), it will be difficult to pass the burning test (UL94, 1.5 mm).

As used herein, the polycarbonate composition refers to a mixture obtained by mixing the starting materials, and is preferably in the form of solid granules obtained after being melted, extruded and granulated.

In an embodiment of the present invention, inorganic filler(s) other than talc is/are present in the polycarbonate composition in an amount of 8% by weight or less, preferably in an amount of 5% by weight or less. In a particularly preferred embodiment of the present invention, the polycarbonate composition comprises no inorganic filler other than talc. The expression "the polycarbonate composition comprises no inorganic filler other than talc" means that no material other than talc, that can be used as an inorganic filler, such as mica, wollastonite and the like, is present in any form in the composition of the present invention.

Articles made from the aromatic polycarbonate composition of the present invention have a Rockwell hardness (HRM scale) of 60-69, preferably 61-68.5, more preferably 62-68, according to ISO 2039-2:1987.

Preferably, the content of each component in the polycarbonate composition is as follows:

the content of the component (A) is 50 to 77% by weight, more preferably 53 to 75% by weight, even further preferred 55 to 65% by weight, based on 100% by weight of the total amount of (A) to (D);

the content of the component (B) is 0 to 15% by weight, more preferably 3 to 13% by weight, even further preferred 6 to 12% by weight, based on the total weight of the components (A) to (D);

the content of the component (C) is 19 to 33% by weight, more preferably 20 to 31% by weight, even further preferred 22 to 30% by weight, based on 100% by weight of the total amount of (A)-(D);

the content of the component (D) is >2.5 to <7.5% by weight, preferably 3.0 to 7.2% by weight, more preferably 3.25 to 7% by weight, particularly preferred 3.5 to 6.5% by weight, most preferred 4 to 6% by weight, based on 100% by weight of the total amount of (A) to (D); and the content of the component (E) is 0.02 to 2 parts by weight, more preferably 0.1 to 1.5 parts by weight, and even more preferably 0.2 to 1 part by weight, most preferred 0.3 to 0.5 part by weight, based on 100 parts by weight of the total amount of components (A) to (D).

In a particularly preferred embodiment of the present invention, the content of each component in the polycarbonate composition is as follows:

the content of the component (A) is 55 to 65% by weight, based on 100% by weight of the total amount of (A) to (D);

the content of the component (B) is 6 to 12% by weight, based on 100% by weight of the total amount of (A)-(D);

the content of the component (C) is 22 to 30% by weight, based on 100% by weight of the total amount of (A)-(D);

the content of the component (D) is 4 to 6% by weight, based on 100% by weight of the total amount of (A) to (D); and the content of the component (E) is 0.2 to 1 part by weight, based on 100 parts by weight of the total amount of components (A) to (D).

To further illustrate the present invention, the components of the present invention are described in more detail below.

Component (A) Polycarbonate

The polycarbonate in the present invention has a weight average molecular weight measured by gel permeation chromatography (GPC) with bisphenol A based polycarbonate standards, diluent dichloromethane, of from 20,000 to 32,000 g/mol, preferably from 23,000 to 28,000 g/mol, more preferably from 24,000 to 26,000 g/mol.

Preferably, the polycarbonate is a linear thermoplastic aromatic polycarbonate.

More preferably, the linear thermoplastic aromatic polycarbonate has a weight average molecular weight of from 20,000 to 32,000 g/mol, preferably from 23,000 to 28,000 g/mol, more preferably from 24,000 to 26,000 g/mol.

In a preferred embodiment, the polycarbonate is produced from dihydroxyaryl compounds, carbonic acid derivatives and optional chain terminators in a known manner.

Dihydroxyaryl compounds suitable for the preparation of polycarbonates are those of the formula (2)

$$\text{HO—Z—OH} \quad (2)$$

in which

Z is an aromatic radical which has 6 to 30 carbon atoms and may contain one or more aromatic rings, may be substituted and may contain aliphatic or cycloaliphatic radicals or alkylaryls or heteroatoms as bridging elements.

Preferably, Z in formula (2) is a radical of the formula (3)

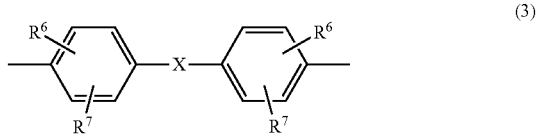

where $R^6$ and $R^7$ are independently H, $C_1$- to $C_{18}$-alkyl-, $C_1$- to $C_{18}$-alkoxy, halogen such as Cl or Br or in each case optionally substituted aryl or aralkyl, preferably H or $C_1$- to $C_{12}$-alkyl, more preferably H or $C_1$- to $C_8$-alkyl and most preferably H or methyl, and X is a single bond, —SO$_2$—, —CO—, —O—, —S—, $C_1$- to $C_6$-alkylene, $C_2$- to $C_5$-alkylidene or $C_5$- to $C_6$-cycloalkylidene which may be substituted by $C_1$- to $C_6$-alkyl, preferably methyl or ethyl, and also $C_6$- to $C_{12}$-arylene which may optionally be fused to aromatic rings containing further heteroatoms.

Preferably, X is a single bond, $C_1$- to $C_5$-alkylene, $C_2$- to $C_5$-alkylidene, $C_5$- to $C_6$-cycloalkylidene, —O—, —SO—, —CO—, —S—, —SO$_2$— or a radical of the formula (3a)

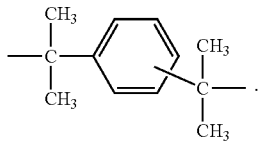

(3a)

Examples of dihydroxyaryl compounds (diphenols) are: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulphides, bis(hydroxyphenyl) sulphones, bis(hydroxyphenyl) sulphoxides, 1,1'-bis(hydroxyphenyl)diisopropylbenzenes and the ring-alkylated and ring-halogenated compounds thereof.

Examples of diphenols suitable for the preparation of the polycarbonates and copolycarbonates to be used in accordance with the invention include hydroquinone, resorcinol, dihydroxydiphenyl, bis(hydroxyphenyl)alkanes, bis(hydroxyphenyl)cycloalkanes, bis(hydroxyphenyl) sulphides, bis(hydroxyphenyl) ethers, bis(hydroxyphenyl) ketones, bis(hydroxyphenyl) sulphones, bis(hydroxyphenyl) sulphoxides, α,α'-bis(hydroxyphenyl)diisopropylbenzenes, and the alkylated, ring-alkylated and ring-halogenated compounds thereof. Preparation of copolycarbonates can also be accomplished using Si-containing telechelics, such that what are called Si copolycarbonates are obtained.

Preferred diphenols are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulphone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC), and also the bisphenols (I) to (III)

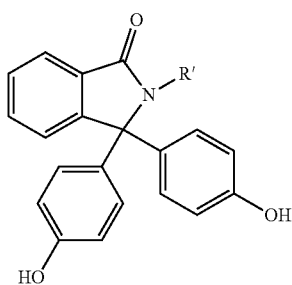

(I)

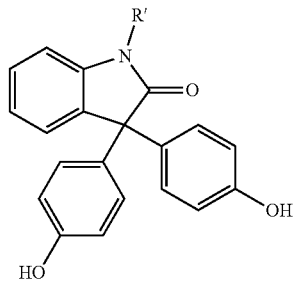

(II)

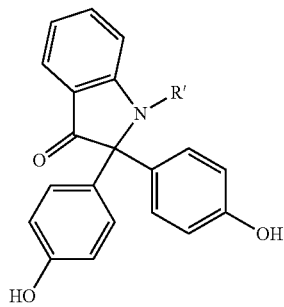

(III)

in which R' in each case is a $C_1$- to $C_4$-alkyl radical, aralkyl radical or aryl radical, preferably a methyl radical or phenyl radical, most preferably a methyl radical.

Particularly preferred diphenols are 4,4'-dihydroxydiphenyl, 1,1-bis(4-hydroxyphenyl)phenylethane, 2,2-bis(4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC), and also the diphenols of the formulae (I), (II) and/or (III).

These and further suitable diphenols are described, for example, in U.S. Pat. Nos. 2,999,835 A, 3,148,172 A, 2,991,273 A, 3,271,367 A, 4,982,014 A and 2,999,846 A, in German published specifications 1 570 703 A, 2 063 050 A, 2 036 052 A, 2 211 956 A and 3 832 396 A, in French patent specification 1 561 518 A1, in the monograph "H. Schnell, Chemistry and Physics of Polycarbonates, Interscience Publishers, New York 1964, p. 28 ff.; p. 102 ff.", and in "D. G. Legrand, J. T. Bendler, Handbook of Polycarbonate Science and Technology, Marcel Dekker New York 2000, p. 72ff.".

Only one diphenol is used in the case of the homopolycarbonates; two or more diphenols are used in the case of copolycarbonates.

Particularly preferred polycarbonates are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane or the two monomers bisphenol A and 4,4'-dihydroxydiphenyl, and homo- or copolycarbonates derived from the diphenols of the formulae (I), (II) and/or (III)

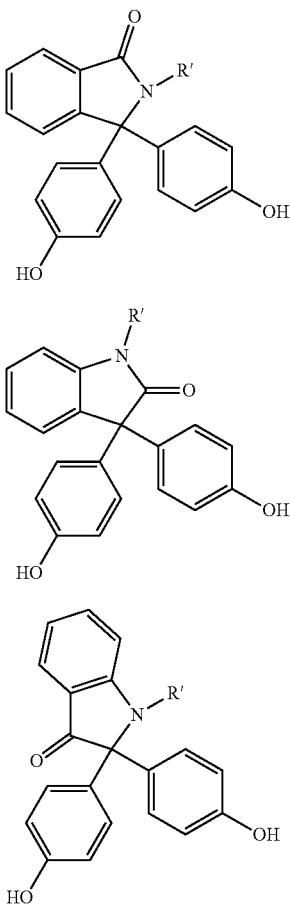

in which R' in each case is $C_1$- to $C_4$-alkyl, aralkyl or aryl, preferably methyl or phenyl, most preferably methyl, especially with bisphenol A.

Only one dihydroxyaryl compound is used in the case of homopolycarbonate. The dihydroxyaryl compounds used and all other auxiliaries and chemicals added to the synthesis can be contaminated with impurities from their own synthesis, processing and storage. However, it is desired to operate with extremely pure raw materials.

As monofunctional chain terminators necessary for adjusting molecular weight, phenols or alkylphenols, in particular phenol, p-tert-butylphenol, isooctylphenol, cumylphenol, their chlorocarbonates or acyl chlorides of monocarboxylic acid, and/or mixtures of these chain terminators are useful.

Preferred means for producing the polycarbonates used for the present invention are the known interfacial processes and the known melt transesterification processes (see, for example, WO 2004/063249 A1, WO 2001/05866 A1, WO 2000/105867, U.S. Pat. Nos. 5,340,905 A, 5,097,002 A, 5,717,057 A). In the first case, the acid derivatives are preferably phosgene and optionally a dicarboxylic acid dichloride; the catalyst, solvent, work-up, reaction conditions and the like used to produce the polycarbonates are broadly described and are well known. The polycarbonates can be worked-up in a known manner and processed into any desired type of moldings, for example by extrusion or injection molding processing.

The polycarbonates can be prepared by known processes or are commercially available, for example as Makrolon® 2408 from Covestro.

In the present invention, the component (A) is present in an amount of 50 to 77% by weight, preferably 53 to 75% by weight, more preferably 55 to 65% by weight, based on 100% by weight of the total amount of (A) to (D).

Component (B) Acrylonitrile-Styrene Copolymer

In the present invention, acrylonitrile-styrene copolymer is generally referred to as AS resin. The proportion of acrylonitrile is from 5 to 50% by weight, preferably from 15 to 35% by weight, the proportion of styrene is from 95 to 50% by weight, preferably from 85 to 65% by weight, based on 100% by weight of the overall acrylonitrile-styrene copolymer. The acrylonitrile-styrene copolymer can be prepared by any processes selected from the group consisting of bulk polymerization, solution polymerization, suspension polymerization and emulsion polymerization, preferably bulk polymerization or suspension polymerization. Further, copolymerization process can be one-step copolymerization or multi-step copolymerization. The acrylonitrile-styrene copolymer has a weight average molecular weight of 40,000-200,000 g/mol, preferably 50,000-160,000 g/mol, more preferably 70,000-150,000 g/mol, measured by gel permeation chromatography (GPC) in terms of standard polystyrene of the Component (B).

The acrylonitrile-styrene copolymer can be prepared by known processes or is commercially available, for example as LUSTRAN® SAN DN50 from INEOS Styrolution GmbH.

In the present invention, the component (B) is present in an amount of 0 to 15% by weight, preferably 0.1 to 15 wt.-%, more preferably 3 to 13% by weight, even more preferably 6 to 12% by weight, based on 100% by weight of the total amount of components (A) to (D).

Component (C) Inorganic Filler

Component (C) are inorganic fillers, which are present in an amount of 19 to 33% by weight, preferably 20 to 31% by weight, and more preferably 22 to 30% by weight, wherein talc is contained in an amount of 13 to 33% by weight, preferably 15 to 33% by weight, more preferably 17 to 33% by weight, based on 100% by weight of the total amount of the components (A) to (D).

The talc used as one of the components (C) of the present invention has a specific surface area of from 4 to 18 m²/g, preferably from 8 to 15 m²/g, more preferably from 10 to 14 m²/g, measured by the B.E.T. method according to DIN ISO 9277:2014-01.

The talc of the present invention has a median particle diameter $D_{50}$ of 3 to 18 µm, preferably 3.1 to 10 µm, more preferably 3.2 to 8 µm, measured by laser diffraction method. "Median particle diameter D50" means the particle size to which 50% of the cumulative particle size distribution percentage of a sample corresponds.

The talc has a Mohs hardness, in accordance with DIN EN 15771:2010-07:1, of 1.

"Mohs hardness" refers to a hardness scale which uses ten common minerals as standards to determine which minerals are harder or softer by scratching them with each other. Mohs hardness minerals are classified as ten rates below:

1) talc; 2) gypsum; 3) calcite; 4) fluorite; 5) apatite; 6) orthoclase; 7) quartz; 8) topaz; 9) corundum; and 10) diamond.

Relative hardness measured by Mohs hardness tester is represented by numbers 1 to 10. If a mineral sample can scratch calcite but cannot scratch fluorite, the Mohs hardness thereof is 3-4, and so on. Mohs hardness value or range of a sample can be expressed as being equal to, greater than or less than a certain hardness rate according to the actual measurement, respectively.

Preferably, further inorganic fillers other than talc in the polycarbonate composition are present in an amount of 8% by weight or less, preferably 5% by weight or less.

More preferably, the polycarbonate composition doesn't contain further inorganic fillers other than talc.

tolyl, phenyl, xylyl, propylphenyl and butylphenyl, as well as their corresponding brominated and chlorinated derivatives.

Most preferably, bisphenol A-based oligomeric phosphates according to formula (Va) are used as component D

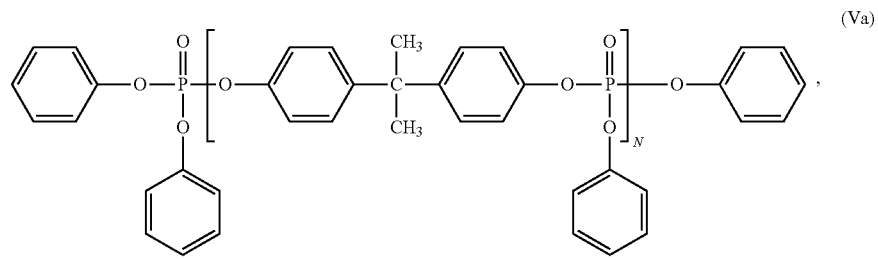

(Va)

The content of component (C) must be within the specific range as above in order to achieve the desired physical properties.

It is surprisingly found by the inventors that the combination of talc with specific surface area and other components provided in this invention significantly influences the flowability, stiffness, flame retardancy and heat resistance. In other words, a good balance among flowability, stiffness, flame retardancy and heat resistance can be achieved by the invention.

The present invention demonstrates that if the specific surface area of the talc is greater than 16 m²/g, the polycarbonate composition fails in the burning test (UL94, 1.5 mm).

Component (D) Organic Phosphorus Compound-Based Flame Retardant

In the present invention, organic phosphorus compound-based flame retardant is preferably selected from the group consisting of mono- and oligo-phosphates and phosphonates and phosphonate amines, or a mixture of one or more thereof. Other halogen-free phosphorus compounds can also be used alone or in any desired combination with other halogen-free phosphorus compounds.

Preferred mono- and oligo-phosphates or phosphonates are phosphorus compounds of the general formula (I)

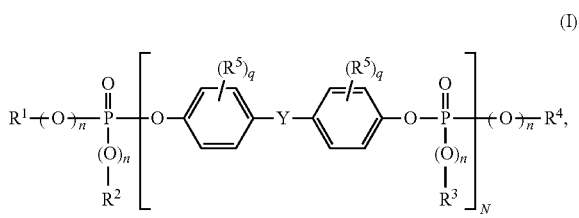

(I)

in which $R^1$, $R^2$, $R^3$ and $R^4$ are, independently from one another, individually optionally halogenated $C_1$ to $C_5$-alkyl, or $C_5$ to $C_6$ cycloalkyl, $C_6$ to $C_{20}$ aryl, or $C_7$ to $C_{12}$ aralkyl, individually optionally substituted by alkyl, preferably $C_1$ to $C_4$-alkyl, and/or by halogen, preferably by chlorine or bromine.

Preferably, $R^1$, $R^2$, $R^3$ and $R^4$ are, independently from each other, $C_1$ to $C_4$ alkyl, phenyl, naphthyl or phenyl-$C_1$ to $C_4$ alkyl. The aromatic radicals $R^1$, $R^2$, $R^3$ and $R^4$ can in turn have substituents which are substituted by halogen radicals and/or by alkyl, preferably by chlorine, bromine and/or $C_1$ to $C_4$ alkyl. Particularly preferred aromatic moieties are wherein N=1.0 to 3.0, preferably 1.05 to 2.0, more preferably 1.05 to 1.6, even more preferably 1.0 to 1.2, in particular N=1.1.

Phosphorus compounds according to component D are known (cf. e.g., EP 0 363 608 A1, EP 0 640 655 A2) or can be analogously prepared according to the known methods (e.g., Ullmanns Enzyklopadie der technischen Chemie [Ullmann's encyclopaedia of industrial chemistry], vol. 18, p. 301 ff. 1979; Houben-Weyl, Methoden der organischen Chemie [Methods of organic chemistry], vol. 12/1, p. 43; Beilstein vol. 6, p. 177).

It is also possible to use mixtures of phosphates having different chemical structures and/or having the same chemical structure and different molecular weights as component D of the invention.

It is preferable to use a mixture having the same structure and having different chain lengths, wherein the N value is an average N value. The average N value is determined by calculating the average value of N by determining the composition (molecular weight distribution) of the phosphorus compounds using high-pressure liquid chromatography (HPLC) at 40° C. in a mixture of acetonitrile and water (50:50).

It is also possible to use the phosphonate amines described in WO 2000/00541 A1 and WO 2001/18105 A1 as flame retardant.

The flame retardant of component (D) can be used alone or in any desired mixtures with each other or in a mixture with other flame retardant(s).

In the present invention, the component (D) is present in an amount of >2.5 to <7.5% by weight, preferably 3.0 to 7.2% by weight, more preferably 3.25-7% by weight, particularly preferably 3.5-6.5% by weight, most preferred 4 to 6% by weight, based on 100% by weight of the total amount of (A)-(D).

A good balance among flowability, flame retardancy and heat resistance can be achieved by using a combination of specific content of the organic phosphorus compound-based flame retardant together with other components according to the invention.

If the content of component (D) is 2.5% by weight or less, the UL94 (1.5 mm) test fails. If the content of component D is too high (7.5% by weight or more), the heat distortion temperature (HDT) will be too low (≤104° C.) to be suitable for practical applications.

Component (E) Fluorine-Containing Anti-Dripping Agent

The composition of the present invention contains fluorine-containing anti-dripping agent as component (E), preferably in an amount of 0.02-2 parts by weight, more preferably 0.1-1.5 parts by weight, even further preferred 0.2-1 part by weight, based on the 100 parts by weight of the total amount of components (A) to (D).

Good flame retardancy can be obtained without damaging the physical properties of the shaped articles due to the presence of the fluorine-containing anti-dripping agent. The fluorine-containing anti-dripping agent of the present invention is a fluorine-containing polymer with fiber-forming capability. Examples of the polymer are polytetrafluoroethylene, tetrafluoroethylene-based copolymers (for example, tetrafluoroethylene/hexafluoropropylene copolymer and the like), partially fluorinated polymers disclosed in U.S. Pat. No. 4,379,910 A, polycarbonate resin made from fluorinated biphenols, and the like. Polytetrafluoroethylene (hereinafter referred to as PTFE) is preferable among them.

The composition according to the present invention may further contain, preferably up to 5 pbw, more preferably from 0.01 to 3 pbw, based on the total weight of A)-D), further components selected from one or more of the group consisting of: UV absorbers, antioxidants or heat stabilizers, mold-releasing agents, antistatic agents, dyes and pigments, IR absorbers and impact modifiers.

Examples of suitable antioxidants or heat stabilizers are: alkylated monophenols, alkylthiomethylphenols, hydroquinones and alkylated hydroquinones, tocopherol, hydroxylated thiodiphenyl ether, alkylidene bisphenols; O-, N- and S-benzyl compounds; hydroxylbenzylated malonates, aromatic hydroxybenzyl compounds, triazine compounds, acylaminophenols, esters of β-(3,5-di-tert-butyl-4-hydroxyphenyl) propionic acid, esters of β-(5-tert-butyl-4-hydroxy-3-methylphenyl)propionic acid, esters of β-(3,5-dicyclohexyl-4-hydroxyphenyl) propionic acid, esters of 3,5-di-tert-butyl-4-hydroxyphenylacetic acid, amides of β-(3,5-di-tert-butyl-4-hydroxyphenyl)propionic acid, suitable thiosynergists, secondary antioxidants, phosphites, phosphonites, benzofuranones and indolinones.

Preferred are organic phosphites, for example triphenylphosphine, tritolylphosphine or 2,4,6-tri-tert-butylphenyl 2-butyl-2-ethylpropan-1,3-diyl phosphite, phosphonates and phosphorus hydride compounds; most preferred are those in which the organic part consists wholly or to an extent of an optionally substituted aromatic moiety. Very particularly suitable additives are IRGANOX 1076® and triphenylphosphine (TPP).

Examples of suitable UV absorbers from the benzotriazoles are Tinuvin® 171 (2-[2-hydroxy-3-dodecyl-5-methylbenzyl)phenyl]-2H-benzotriazole (CAS No. 125304-04-3)), Tinuvin® 234 (2-[2-hydroxy-3,5-bis(1,1-dimethylbenzyl) phenyl]-2H-benzotriazole (CAS No. 70321-86-7)), Tinuvin® 328 (2-2 [hydroxy-3,5-di-tert-amylphenyl)-2H-benzotriazole (CAS No. 25973-55-1)).

Examples of suitable UV absorbers from N, N'-diphenyloxalamides are Sanduvor® 3206 (N-(2-ethoxyphenyl)oxalamide (CAS No. 82493-14-9)) and N-(2-ethoxyphenyl)-N'-(4-dodecylphenyl)oxamide (CAS No. 79102-63-9) from Clariant.

Examples of suitable UV absorbers from hydroxylbenzophenones are Chimasorb® 81 (2-benzoyl-5-octyloxyphenol (CAS No. 1843-05-6) from BASF SE), 2,4-dihydroxybenzophenone (CAS No. 131-56-6), 2-hydroxy-4-(n-octyloxy) benzophenone (CAS No. 1843-05-6), and 2-hydroxy-4-dodecyloxybenzophenone (CAS No. 2985-59-3).

Examples of suitable UV absorbers from triazines are 2-[2-hydroxy-4-(2-ethylhexyl)oxy]phenyl-4,6-di(4-phenyl) phenyl-1,3,5-triazine, 2-[2-hydroxy-4-[(octyloxycarbonyl) ethylideneoxy]phenyl-4,6-di(4-phenyl)phenyl-1,3,5-triazine, 2-[2-hydroxy-4-[3-(2-ethylhexyl-1-oxy)-2-hydroxypropyloxy]phenyl-4,6-bis(2,4-dimethylphenyl)-1,3,5-triazine (CAS No. 137658-79-8), also known as Tinuvin® 405 (BASF SE), 2,4-diphenyl-6-[2-hydroxy-4-(hexyloxy) phenyl]-1,3,5-triazine (CAS No. 147315-50-2), available as Tinuvin® 1577 (BASF SE). The compound 2-[2-hydroxy-4-(2-ethylhexyl)oxy]phenyl-4,6-bis(4-phenyl)phenyl-1,3,5-triazine has the CAS No. 204848-45-3 and is available as Tinuvin® 479 from BASF SE. The compound 2-[2-hydroxy-4-[(octyloxycarbonyl)ethylideneoxy]phenyl-4,6-bis (4-phenyl)phenyl-1,3,5-triazile has the CAS No. 204583-39-1 and is available as CGX-UVA006 or Tinuvin® 1600 from BASF SE.

Examples for usable dyes or pigments are organic or inorganic pigments or organic dyes, and the like. In a preferred embodiment, carbon black is used as the colorant component.

In the composition of the present invention, a mono- or polyhydric alcohol ester of a higher fatty acid can be contained as a mold-releasing agent. As a result, shaped articles with good dimensional stability are provided.

Examples of alcohols suitable for constituting mold-releasing agent of the present invention are esters or partial esters of monohydric to hexahydric alcohols, in particular glycerol, pentaerythritol or Guerbet alcohol.

Examples of monohydric alcohols are stearyl alcohol, palmityl alcohol and Guerbet alcohol; examples of glycols are ethylene glycol; examples of trihydric alcohols are glycerol; examples of tetrahydric alcohols are pentaerythritol and mesoerythritol; examples of pentahydric alcohols are arabitol, ribitol and xylitol, and examples of hexahydric alcohols are mannitol, sorbitol (sorbol) and galactitol.

The fatty acid esters according to the invention are preferably monoesters, diesters, triesters, tetraesters, pentaesters and hexaesters or mixtures thereof, in particular random mixtures. The fatty acids constituting the fatty acid esters of the present invention are saturated aliphatic $C_{10}$ to $C_{24}$ monocarboxylic acids and optional hydroxymonocarboxylic acids, preferably saturated aliphatic $C_{10}$ to $C_{20}$ monocarboxylic acids and optional hydroxymonocarboxylic acids, more preferably saturated aliphatic $C_{14}$ to $C_{18}$ monocarboxylic acids and optional hydroxymonocarboxylic acids.

Commercial available fatty acid esters, especially fatty acid esters of pentaerythritol and glycerol, may contain <60% by weight of various partial esters produced by the manufacturing process.

In a preferred embodiment, the fatty acids are selected from the group consisting of capric acid, lauric acid, myristic acid, palmitic acid, stearic acid and hydroxystearic acid.

Examples of other mold-releasing agents which can be used alone or in addition to the above mentioned ones can be listed as follows: olefinic waxes, silicone oils, fluorocarbon oils, organopolysiloxanes, paraffins and beeswax, and maleic anhydride-modified ethylene propylene copolymers.

The flame-retardant resin composition of the present invention may contain a small amount less than 5 parts by weight, based on the total amount of components (A) to (D), of a rubbery polymer as an impact modifier.

More specific rubbery polymers can be listed as follows: SB (styrene-butadiene) polymer, ABS (acrylonitrile-butadiene-styrene) polymer, MBS (methyl methacrylate-butadiene-styrene) polymer, MABS (methyl methacrylate-acrylonitrile-butadiene-styrene) polymer, MB (methyl methacrylate-butadiene) polymer, ASA (acrylonitrile-styrene-acrylic rubber) polymer, AES (acrylonitrile-ethylene propylene rubber-styrene) polymer, MA (methyl methacrylate-acrylic rubber) polymer, MAS (methyl methacrylate-acrylic rubber-styrene polymer), methyl methacrylate-acrylic butadiene rubber copolymer, methyl methacrylate-acrylic-butadiene rubber-styrene copolymer, methyl methacrylate-(acrylic siloxane interpenetrating network (IPN) rubber) polymers and the like. Among these polymers, a core-shell type graft copolymer in which a polymer chain consisting of the above-mentioned monomers is bonded to a core of a polymer consisting of any of the rubber components is preferable.

Moreover, the rubbery polymer of the present invention may also be in a form being included in other components. As an example of the rubbery polymer in said form, for example, ABS copolymer is included in ABS resin.

The polycarbonate composition of the present invention can be prepared by a conventional method known to those skilled in the art by for example, mixing the above-mentioned components in a conventional apparatus such as an extruder with screw (e.g., a twin-screw extruder), a kneader or a Banbury mixer, homogenizing and then extruding. It is preferable to be melt and extruded in a twin-screw extruder. It is also possible to premix the individual components and then to add the remaining raw materials individually and/or also in the form of mixtures.

The polycarbonate composition of the present invention has the following physical properties:

(i) Good flowability: a shear viscosity of 340 Pa·s or less, preferably 300 Pa·s or less, and more preferably 200 to 300 Pa·s, at a shear rate of 1000 $s^{-1}$ at 260° C. according to ISO 11443: 2014;

(ii) High stiffness: a flexural elastic modulus of 6000 MPa or higher, preferably 6200 MPa or higher, more preferably from 6200 MPa to 8500 MPa at 2 mm/min according to ISO 178: 2010;

(iii) High heat resistance: heat distortion temperature (HDT) of 105° C. or higher, preferably 108° C. or higher, more preferably 108 to 115° C. at 1.8 MPa according to ISO 75-2: 2013;

(iv) Excellent flame retardancy: passing V0 or V1 in UL94 burning test at 1.5 mm according to UL94: 2015;

(v) Low hardness: the aromatic polycarbonate of the present invention has a Rockwell hardness (HRM scale) of 60-69, preferably 61-68.5, more preferably 62-68, according to ISO 2039-2:1987.

Molded articles are preferably produced by injection molding, thermoforming, extrusion, lamination, molding, in-mold decoration, in-mold coating and rapid thermal cycling molding.

The polycarbonate composition of the present invention can be used for a variety of articles for use in electrical and electronic fields, preferably as chassis or frame for parts in electrical, electronic and information technology applications, in particular printers or copiers.

Articles comprising the polycarbonate composition are, for example, also plastic articles for mobile phones, laptops, adapters, chargers, sockets, switches and the like.

The preparation method of the articles according to the present invention comprises one or more of the following steps: molding, extrusion, shaping and the like.

Examples

The present invention will be further demonstrated with reference to the examples below. The following examples are only used to further illustrate the present invention, without being construed as limiting the present invention.

Unless otherwise specified, all percentages in the present invention are % by weight. Unless otherwise specified, the weight average molecular weight ($M_w$) mentioned is determined by gel permeation chromatography (GPC) with linear bisphenol A based polycarbonate standards, dichloromethane as diluent.

Sources and Characteristics of the Raw Materials

Component A:

PC: aromatic polycarbonate resin (aromatic polycarbonate resin pellets having a weight average molecular weight of about 24,000 g/mol produced from bisphenol A and phosgene by a conventional method, Makrolon® 2408 from Covestro, Ltd.).

Component B:

AS resin: acrylonitrile-styrene copolymer, weight average molecular weight measured by gel permeation chromatography as mentioned above (GPC): 100,000 g/mol, acrylonitrile content: 24 wt %, and styrene content: 76 wt %, LUSTRAN® SAN DN50 from INEOS Styrolution GmbH).

Component C:

Talc-1: talc. HTPultra5C, available from IMI FABI S.p.A., median particle diameter $D_{50}$ measured by laser diffraction method: 3.2 μM, specific surface area measured by B.E.T method in accordance with DIN ISO 9277:2014-01: 13.5 m²/g.

Talc-2: talc. HM4, available from IMI FABI S.p.A., median particle diameter D50 measured by laser diffraction method: 18 μM, specific surface area measured by B.E.T method in accordance with DIN ISO 9277:2014-01: 4 m²/g.

Talc-3: talc. HTPultra1C, available from IMIFabi SpA, median particle diameter D50 measured by laser diffraction method: 7 μm, specific surface area measured by B.E.T method in accordance with DIN ISO 9277:2014-01 10 m²/g.

Talc-4: talc. HVTultraC, available from IMIFabi SpA, median particle diameter D50 measured by laser diffraction method: 3.3 μM, specific surface area measured by B.E.T method in accordance with DIN ISO 9277:2014-01: 14 m²/g.

Talc-5: talc. HVTextra, available from IMIFabi SpA, median particle diameter D50 measured by laser diffraction method: 15 μm, specific surface area measured by B.E.T method in accordance with DIN ISO 9277:2014-01: 20 m²/g.

MICA: muscovite having median particle diameter D50 measured by laser diffraction method of about 34 μm. White mica powder, available from Imerys, Mohs hardness in accordance with DIN EN 15771:2010-07: 2.5.

Component D:

FR-1: Bisphenol A bis(diphenyl phosphate), ADK Stab FP-700, available from ADEKA (Shanghai) Co., Ltd., China.

Component E:

PTFE: polytetrafluoroethylene, POLYB FS-200, available from Han Nanotech Co., Ltd.

Additional Components:

PETS: pentaerythritol tetrastearate (Faci L349, available from Shanghai Coke Import China).

CB: carbon black, Black Pearls® 800, available from Cabot.

Examples 1-14 according to the invention and comparative examples 1-9 (see Tables 1-4)

Component E and additional components among the components shown in Tables 1-4, except for the aromatic polycarbonate resin (Component A), AS resin (Component B), the component C, and organic phosphorus compound-based flame retardant (Component D), were premixed in a high-speed laboratory mixer (LMX10-VS, available from Henschel) to form a mixture. This mixture was fed into a drop chute of a twin-screw extruder (ZSK26, available from Coperion) having a screw diameter of 26 mm. The drop chute afforded an entrance to the main extruder. In the examples 1-14 according to the invention, the aromatic polycarbonate resin (Component A) and AS resin (Component B) with a specific content were fed through a solid particle feeding system into the drop chute. Component D with a specific content was heated to a temperature ranging from 60 to 80° C. and then added through a liquid feeding system into the main extruder. Component (C) with a specific content was fed through a solid powder feeding system into the side extruder, through which the component (C) was added to the middle position of the main extruder. It is also possible, if necessary, to feed all or part of the component (C) through the solid powder feeding system to the drop chute, which afforded an entrance to the main extruder. The materials were melted and mixed at a melting temperature of about 240 to 265° C. in the main extruder, and then pelletized. The resulting pellets were dried by a hot air-circulating drier (LUXOR 50, available from Motan) at 90° C. for 4 hours. Test specimens for assessment were made by using an injection molding machine (Arburg 370, available from Arburg GmbH) at a melting temperature of 260° C. and a mold temperature of 80° C. Assessments were conducted using the following methods or evaluation items.

Test Methods

The compositions according to the examples were tested on physical properties by the following methods:

(i) flowability: the shear viscosity was measured at a shear rate of 1000 s$^{-1}$ at 260° C. according to ISO 11443: 2014-04

(ii) stiffness: the flexural elastic modulus (size of the testing sample: length 80 mm×width 10 mm×thickness 4 mm) was measured at 2 mm/min according to ISO 178: 2010.

(iii) heat resistance: the heat distortion temperature (HDT) (size of the testing sample: length 80 mm×width 10 mm×thickness 4 mm) was measured under a load of 1.8 MPa according to ISO 75-2:2013;

(iv) flame retardancy: burning test was conducted at 1.5 mm according to UL94: 2015;

the experimental method of "conducting burning test at 1.5 mm according to UL94: 2015" is as follows:

The flame retardancy of a material was determined by testing the response of a sample stripe of a standard size (length 127 mm×width 12.7 mm) to heat and flame under specific testing conditions. The instrument used was ATLAS combustion chamber HVUL2. The determination of flame retardant rate is shown in the table below:

| Burning rate of materials | | | |
|---|---|---|---|
| Assessment condition | V-0 | V-1 | V-2 |
| the first burning time $t_1$ or the second burning time $t_2$ of each sample stripe | ≤10 s | ≤30 s | ≤30 s |
| sum of the first burning time $t_1$ and the second burning time $t_2$ of five sample stripes | ≤50 s | ≤250 s | ≤250 s |
| sum of the second burning time $t_2$ and the second glowing time $t_3$ of each sample stripe | ≤30 s | ≤60 s | ≤60 s |
| Whether the sample stripe is burned up to the clamped position or not? | No | No | No |
| Whether the cotton is ignited or not? | No | No | Yes |

(v) Rockwell hardness: Rockwell hardness is a non-dimensional indicative for mechanical property with no unit. The hardness of thermoplastics (size of the testing sample: length 80 mm×width 10 mm×thickness 4 mm) was measured on a HRM scale using a Toyoseiki Model DRH-M instrument at an indenter diameter of 6.350 mm according to ISO 2039-2:1987, with an initial test force of 98.07 Newton and a total test force of 980.7 Newton.

(vi) Mohs hardness: a hardness scale which uses ten common minerals as standards to determine which minerals are harder or softer by scratching them with each other. Determination according to DIN EN 15771:2010-07:1. Mohs hardness minerals are classified as ten rates below:

1) talc; 2) gypsum; 3) calcite; 4) fluorite; 5) apatite; 6) orthoclase; 7) quartz; 8) topaz; 9) corundum; and 10) diamond.

Relative hardness measured by Mohs hardness tester is represented by numbers 1 to 10. If a mineral sample can scratch calcite but cannot scratch fluorite, the Mohs hardness thereof is 3-4, and so on. Mohs hardness value or range of a sample can be expressed as being equal to, greater than or less than a certain hardness rate according to the actual measurement, respectively.

TABLE 1

The compositions and properties of examples 1-6 according to the invention compared with those of comparative examples 1-2

| Item | | | Comp. Ex. 1 | Inv. Ex. 1 | Inv. Ex. 2 | Inv. Ex. 3 | Inv. Ex. 4 | Inv. Ex. 5 | Inv. Ex. 6 | Comp. Ex. 2 | Property requirements |
|---|---|---|---|---|---|---|---|---|---|---|---|
| Components | Component A (wt %) | PC | 66.5 | 65.75 | 65 | 64.25 | 63 | 71.5 | 71 | 70.5 | |
| | Component B (wt %) | AS | 9 | 9 | 9 | 9 | 9 | 0 | 0 | 0 | |
| | Component C (wt %) | Talc-1 | 22 | 22 | 22 | 22 | 22 | 22 | 22 | 22 | |
| | Component D (wt %) | FR-1 | 2.5 | 3.25 | 4 | 4.75 | 6 | 6.5 | 7 | 7.5 | |
| | Total amount of Components A-D (parts by weight) | | 100 | 100 | 100 | 100 | 100 | 100 | 100 | 100 | |
| | Component E (parts by weight) | PTFE | 0.4 | 0.4 | 0.4 | 0.4 | 0.4 | 0.4 | 0.4 | 0.4 | |
| | Additional Components (parts by weight) | PETS | 0.4 | 0.4 | 0.4 | 0.4 | 0.4 | 0.4 | 0.4 | 0.4 | |
| | | CB | 0.5 | 0.5 | 0.5 | 0.5 | 0.5 | 0.5 | 0.5 | 0.5 | |
| Evaluation | Shear viscosity (260° C., 1000 s$^{-1}$) | Pa · s | 323 | 302 | 295 | 266 | 240 | 300 | 288 | 276 | ≤340 |
| | Flexural modulus | MPa | 6300 | 6390 | 6450 | 6550 | 6620 | 6690 | 6740 | 6780 | ≥6000, preferably ≥6200 |
| | HDT | ° C. | 116 | 114 | 112 | 108 | 105 | 107 | 105 | 104 | ≥105 |
| | UL94 (at 1.5 mm) | | Fail | V1 | V1 | V1 | V0 | V0 | V0 | V0 | V1 |

As shown in Table 1, the content of Component D (FR-1) must be in the specific range, preferably from 3.25 wt % to 7 wt %, as exemplified in examples 1-6 according to the invention in order to achieve a good balance of the flowability, flame retardancy and heat resistance. If the content of Component D is 2.5 wt % or less like in comparative example 1, the composition would fail to pass the UL94 test (at 1.5 mm); and if the content of Component D is 7.5 wt % or higher, like in comparative example 2, the heat distortion temperature (HDT) would be too low (≤104° C.) so that the composition would be unsuitable for practical applications.

TABLE 2

The compositions and properties of examples 2 and 7-10 according to the invention compared with those of comparative examples 3-4

| Item | | | Comp. Ex. 3 | Inv. Ex. 7 | Inv. Ex. 2 | Inv. Ex. 8 | Inv. Ex. 9 | Inv. Ex. 10 | Comp. Ex.4 | Property requirements |
|---|---|---|---|---|---|---|---|---|---|---|
| Components | Component A (wt %) | PC | 69 | 67 | 65 | 63 | 60 | 55 | 54 | |
| | Component B (wt %) | AS | 9 | 9 | 9 | 9 | 9 | 9 | 6 | |
| | Component C (wt %) | Talc-1 | 18 | 20 | 22 | 24 | 26 | 30 | 34 | |
| | Component D (wt %) | FR-1 | 4 | 4 | 4 | 4 | 5 | 6 | 6 | |
| | Total amount of Components A-D (parts by weight) | | 100 | 100 | 100 | 100 | 100 | 100 | 100 | |
| | Component E (parts by weight) | PTFE | 0.4 | 0.4 | 0.4 | 0.4 | 0.4 | 0.4 | 0.4 | |
| | Additional Components (parts by weight) | PETS | 0.4 | 0.4 | 0.4 | 0.4 | 0.4 | 0.4 | 0.4 | |
| | | CB | 0.5 | 0.5 | 0.5 | 0.5 | 0.5 | 0.5 | 0.5 | |
| Evaluation | Shear viscosity (260° C., 1000 s$^{-1}$) | Pa·s | 303 | 295 | 295 | 279 | 248 | 208 | 228 | ≤340 |
| | Flexural modulus | MPa | 5640 | 6040 | 6450 | 6835 | 7325 | 8210 | 9020 | ≥6000, preferably ≥6200 |
| | HDT | ° C. | 111 | 110 | 112 | 111 | 108 | 105 | 103 | ≥105 |
| | UL94 (at 1.5 mm) | | V0 | V1 | V1 | V1 | V1 | V1 | Fail | V1 |

As shown in Table 2, the content of Component (C) (inorganic filler) must be in the specific range from 19% to 33% by weight (see examples 2 and 7-10 according to the invention) in order to achieve the desired physical properties. If the content of Component C is less than 19% by weight (e.g., being 18% by weight like in comparative example 3), the flexural modulus would be less than 6000 Pa·s so that the stiffness of the resulting polycarbonate composition would fail to meet the application requirements; and if the content of Component C is too high (i.e. more than 33% by weight, e.g., being 34% by weight like in comparative example 4), it would be difficult for the composition to pass the burning test (UL94 at 1.5 mm).

TABLE 3

The compositions and properties of examples 2 and 11-13 according to the invention compared with those of comparative example 5.

| Item | | | Inv. Ex. 11 | Inv. Ex. 12 | Inv. Ex. 2 | Inv. Ex. 13 | Comp. Ex. 5 | Property requirements |
|---|---|---|---|---|---|---|---|---|
| Components | Component A (wt %) | PC | 65 | 65 | 65 | 65 | 65 | |
| | Component B (wt %) | AS | 9 | 9 | 9 | 9 | 9 | |
| | Component C (wt %) | Talc-2 Specific surface area (B.E.T) = 4 | 22 | | | | | |
| | | Talc-3 Specific surface area (B.E.T) = 10 | | 22 | | | | |
| | | Talc-1 Specific surface area (B.E.T) = 13.5 | | | 22 | | | |
| | | Talc-4 Specific surface area (B.E.T) = 14 | | | | 22 | | |
| | | Talc-5 | | | | | 22 | |

TABLE 3-continued

The compositions and properties of examples 2 and 11-13 according to the invention compared with those of comparative example 5.

| Item | | | Inv. Ex. 11 | Inv. Ex. 12 | Inv. Ex. 2 | Inv. Ex. 13 | Comp. Ex. 5 | Property requirements |
|---|---|---|---|---|---|---|---|---|
| | Component D (wt %) | Specific surface area (B.E.T) = 20 FR-1 | 4 | 4 | 4 | 4 | 4 | |
| | Total amount of Components A-D (parts by weight) | | 100 | 100 | 100 | 100 | 100 | |
| | Component E (parts by weight) | PTFE | 0.4 | 0.4 | 0.4 | 0.4 | 0.4 | |
| | Additional Components (parts by weight) | PETS | 0.4 | 0.4 | 0.4 | 0.4 | 0.4 | |
| | | CB | 0.5 | 0.5 | 0.5 | 0.5 | 0.5 | |
| Evaluation | Shear viscosity (260° C., 1000 s$^{-1}$) | Pa · s | 319 | 307 | 295 | 283 | 240 | ≤340 |
| | Flexural modulus | MPa | 6070 | 6190 | 6450 | 6230 | 6670 | ≥6000, preferably ≥6200 |
| | HDT | ° C. | 110 | 112 | 112 | 110 | 109 | ≥105 |
| | UL94 (at 1.5 mm) | | V0 | V0 | V1 | V1 | Fail | V1 |

As shown in Table 3, the specific surface area of talc has a significant influence on the flowability, stiffness, flame retardancy and heat resistance. A good balance of the flowability, stiffness, flame retardancy and heat resistance can be achieved by using talc with a specific surface area in the range of 4 to 18 m$^2$/g (see examples 2 and 11-13 according to the invention). However, if the specific surface area of the talc is greater than 16 m$^2$/g (e.g., being 20 m$^2$/g like in comparative example 5), the polycarbonate composition would fail in the burning test (UL94 at 1.5 mm).

TABLE 4

The compositions and properties of examples 2 and 14 according to the invention compared with those of comparative examples 6 and 7-8.

| Item | | | Inv. Ex. 2 | Inv. Ex. 14 | Comp. Ex. 7 | Comp. Ex. 6 | Comp. Ex. 8 | Property requirements |
|---|---|---|---|---|---|---|---|---|
| Components | Component A (wt %) | PC | 65 | 65 | 65 | 65 | 65 | |
| | Component B (wt %) | AS | 9 | 9 | 9 | 9 | 9 | |
| | Component C (wt %) | Talc-1 with Specific surface area (B.E.T) = 13.5 | 22 | 17 | 12 | 7 | 0 | |
| | | mica | 0 | 5 | 10 | 15 | 22 | |
| | Component D (wt %) | FR-1 | 4 | 4 | 4 | 4 | 4 | |
| | Total amount of Components A-D (parts by weight) | | 100 | 100 | 100 | 100 | 100 | |
| | Component E (parts by weight) | PTFE | 0.4 | 0.4 | 0.4 | 0.4 | 0.4 | |
| | Additional Components (parts by weight) | PETS | 0.4 | 0.4 | 0.4 | 0.4 | 0.4 | |
| | | CB | 0.5 | 0.5 | 0.5 | 0.5 | 0.5 | |
| Evaluation | Shear viscosity (260° C., 1000 s$^{-1}$) | Pa · s | 295 | 320 | 311 | 324 | 318 | ≤340 |
| | Flexural modulus | MPa | 6450 | 6160 | 6260 | 6290 | 6030 | ≥6000, preferably ≥6200 |
| | HDT | ° C. | 112 | 112 | 111 | 111 | 111 | ≥105 |
| | UL94 (at 1.5 mm) | | V1 | V1 | V1 | V1 | V1 | V1 |
| | Rockwell hardness | HRM scale | 63.8 | 67.0 | 69.8 | 72.5 | 78.2 | ≤69 |

It is clear from Table 4 that the decrease of talc proportion and the increase of mica proportion shows a considerable effect on the Rockwell hardness of the composition.

As shown in Table 4, the Rockwell hardness of the composition is improved as the mica content in the filler increases. For the purpose of reducing the mold abrasion, it is necessary for the resulting composition to have a Rockwell hardness in the range of 60 to 90, preferably 61 to 68.5, and more preferably 62 to 68. Only when the mica content is less than or equal to 8% by weight, preferably 5% by weight, the Rockwell hardness of the resulting composition can meet the application requirements. The Rockwell hardness of the composition obtained by using 15% by weight of mica together with 7% by weight of talc or only 22% by weight of mica does not meet the application requirements.

The Rockwell hardness of the composition obtained by using 22% by weight of talc meets the application requirements. The Rockwell hardness of the composition obtained by using 17% by weight of talc together 5% by weight of mica meets the application requirements. In the present invention, it is evident from Table 4 that, in order to obtain a composition with a Rockwell hardness satisfying the application requirements, the mica content in the composition of the present invention should be less than or equal to 8% by weight; preferably the mica content in the composition of the present invention should be 5% or less; and most preferably, the composition of the present invention does not comprise any additional filler other than talc.

In summary, the resultant composition had a lower hardness so that abrasion of the mold can be reduced and, at the same time, physical properties (flowability, stiffness, flame retardancy, and heat resistance) were comparable to those of comparative example 6 using two kinds of fillers (mica and talc), or even better than those of comparative example 6, due to the use of talc having a particular specific surface area, a particular particle size and a low hardness as well as a particular composition according to the invention. That is, the present invention achieved a comprehensive optimization of good flowability, high stiffness, good flame retardancy and heat resistance as well as low hardness of the composition. In addition, the composition of the present invention greatly reduces the costs for raw materials and production.

The invention claimed is:

1. A polycarbonate composition consisting of:
(A) a polycarbonate in an amount of from 55 to 71.5 wt % by weight, based 100% of the total amount of the components (A) to (D), wherein the polycarbonate is a homopolycarbonate based on bisphenol A, the homopolycarbonate based on 1,1-bis(4-hydroxyphenyl)-3,3,5-trimethylcyclohexane; or a copolycarbonate based on the two monomers bisphenol A and 1,1-bis(4-hydroxyphenyl)-3,3,5-trimethylcyclohexane or the two monomers bisphenol A and 4,4'-dihydroxydiphenyl; or homo- or copolycarbonates derived from diphenols of formulae (I), (II) and/or (III):

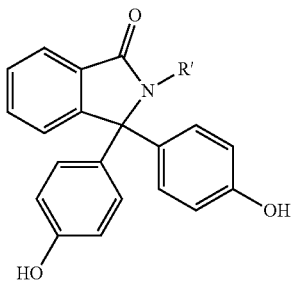

(I)

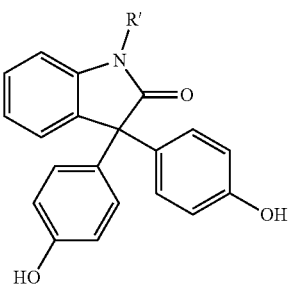

(II)

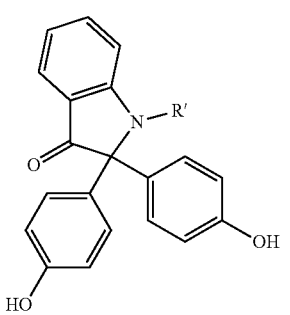

(III)

in which R' in each case is C1- to C4-alkyl, aralkyl or aryl; and/or mixtures thereof;
(B) an acrylonitrile-styrene copolymer in an amount of 0 to 9 wt % by weight, based on 100 wt % by weight of the total amount of the components (A) to (D);
(C) inorganic filler in an amount of 19 to 33% by weight, wherein talc is contained in an amount of 13 to 33% by weight, based on 100% by weight of the total amount of the components (A) to (D), and wherein an inorganic filler other than the talc is present in the polycarbonate composition in an amount of 8 wt % by weight or less;
(D) an organic phosphorus compound-based flame retardant in an amount of >2.5 to <7.5% by weight, based on 100% by weight of the total amount of the components (A) to (D), wherein the organic phosphorus compound-based flame retardant is of formula (Va)

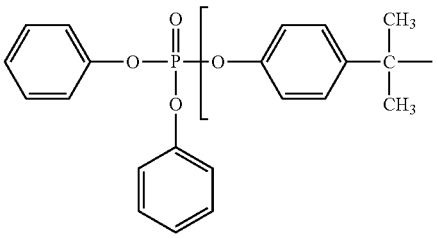

(Va)

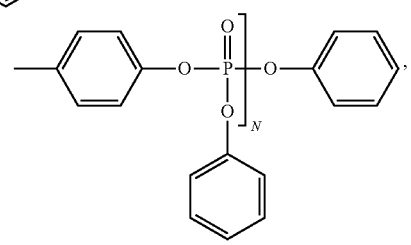

where N is 1.0 to 3.0; and
(E) a fluorine-containing anti-dripping agent; and
(F) optionally up to 5 parts by weight, based on the total weight of components (A) to (D), of a component selected from one or more of the group consisting of: antioxidants or heat stabilizers, mold-releasing agents, dyes and pigments, IR absorbers and impact modifiers, wherein the talc has a specific surface area of 4 to 18 $m^2/g$, as measured by B.E.T. method in accordance with DIN ISO 9277:2014-01; the talc has a median particle diameter $D_{50}$ of 3 to 18 μm, as measured by laser diffraction method.

2. The polycarbonate composition according to claim 1, wherein the component (A) is present in an amount of 55 to 65 wt % by weight, based on 100% by weight of the total amount of the components (A) to (D);
the component (E) is present in an amount of 0.02 to 2 parts by weight, based on 100 parts by weight of the total amount of the components (A) to (D).

3. The polycarbonate composition according to claim 1, wherein at least the mold-releasing agent is contained as component (F) and the mold-releasing agent is a fatty acid ester, where the fatty acid constituting said fatty acid ester is a saturated aliphatic $C_{10}$ to $C_{24}$ mono-carboxylic acid and an optional hydroxyl mono-carboxylic acid.

4. The polycarbonate composition according to claim 3, wherein the fatty acid is selected from the group consisting of capric acid, lauric acid, myristic acid, palmitic acid, stearic acid, and hydroxy stearic acid.

5. The polycarbonate composition according to claim 1, wherein the inorganic filler (C) is contained in an amount of 20 to 33% by weight, based on 100% by weight of the total amount of the components (A) to (D), and the component (D) is contained in an amount of 3.25 to 7% by weight, based on 100% by weight of the total amount of the components (A) to (D).

6. The polycarbonate composition according to claim 1, wherein the fluorine-containing anti-dripping agent is contained in an amount of 0.2 to 1 parts by weight, based on 100 parts by weight of the total amount of components (A) to (D).

7. The polycarbonate composition according to claim 1, wherein the talc has a specific surface area of 8 to 15 $m^2/g$, as measured by B.E.T. method in accordance with DIN ISO 9277:2014-01.

8. A molded article formed from the polycarbonate composition according to claim 1.

9. A method comprising providing the polycarbonate composition according to claim 1 and preparing a chassis or frames of parts useful in electrical, electronic and information technology applications.

\* \* \* \* \*